(12) United States Patent
Survis et al.

(10) Patent No.: US 10,077,083 B1
(45) Date of Patent: Sep. 18, 2018

(54) TAILGATE WITH MOVABLE SUPPORT PLATE

(71) Applicants: Michael Albert Survis, West Bend, WI (US); Adam Michael Survis, Random Lake, WI (US)

(72) Inventors: Michael Albert Survis, West Bend, WI (US); Adam Michael Survis, Random Lake, WI (US)

(73) Assignee: Michael A. and Sandra M. Survis, West Bend, WI (US), Revocable Trust ( * ) Notice: Subject to any disclaimer, the term of this patent is extended or adjusted under 35 U.S.C. 154(b) by 43 days.

(21) Appl. No.: 15/205,529

(22) Filed: Jul. 8, 2016

Related U.S. Application Data

(60) Provisional application No. 62/192,050, filed on Jul. 13, 2015.

(51) Int. Cl.
*B62D 33/027* (2006.01)

(52) U.S. Cl.
CPC .................................. *B62D 33/027* (2013.01)

(58) Field of Classification Search
CPC ............................ B62D 33/027; B62D 33/023
USPC ....................................................... 296/26.11
See application file for complete search history.

(56) References Cited

U.S. PATENT DOCUMENTS

| 4,472,639 | A | 9/1984 | Bianchi |
| 5,468,038 | A | 11/1995 | Sauri |
| 5,732,995 | A | 3/1998 | Piccariello |
| 5,741,039 | A | 4/1998 | Habdas |
| 5,775,759 | A | 7/1998 | Cummins |
| 5,788,311 | A | 8/1998 | Tibbals |
| 5,902,000 | A | 5/1999 | Wold |
| 5,975,608 | A * | 11/1999 | Jarman ............... B62D 33/0273 296/26.11 |
| 6,007,127 | A | 12/1999 | Garofalo |
| 6,113,171 | A | 9/2000 | Stearns |
| 6,364,392 | B1 | 4/2002 | Meinke |
| 6,550,841 | B1 | 4/2003 | Burdon et al. |
| 6,764,123 | B1 * | 7/2004 | Bilyard ................... B60P 1/435 296/61 |
| 6,932,404 | B2 | 8/2005 | Vejnar |
| 6,988,756 | B1 | 1/2006 | Meinke et al. |
| 6,994,363 | B2 | 2/2006 | Seksaria et al. |
| 6,994,389 | B1 | 2/2006 | Graffy et al. |
| 7,021,689 | B1 * | 4/2006 | Weisbeck, III .... B62D 33/0273 296/26.11 |
| 7,182,380 | B2 | 2/2007 | Nagle |
| 7,226,100 | B1 | 6/2007 | Willey et al. |

(Continued)

FOREIGN PATENT DOCUMENTS

EP          1215107 A1 *  6/2002  .............. B60P 3/40

*Primary Examiner* — Pinel E Romain
(74) *Attorney, Agent, or Firm* — Brannen Law Office, LLC

(57) ABSTRACT

The present invention relates to a tailgate, and in particular to an improved tailgate having a support plate that is movable to a raised position. The tailgate has a body that mounts to a truck bed in a conventional manner. The body has a cavity. When in a storage position, an extension plate, a first side plate, a second side plate and a support plate are contained within in the cavity. When in a deployed or extended position, the extension plate is rotated relative to the body, the side plates are pivoted up and the support plate is raised within the cavity. The support plate can be raised and lowered automatically as the side plates are swung open and closed.

17 Claims, 19 Drawing Sheets

(56) References Cited

U.S. PATENT DOCUMENTS

| | | | |
|---|---|---|---|
| 7,287,798 B2 | 10/2007 | King | |
| 7,513,552 B2 * | 4/2009 | Carvalho | B60P 1/431 |
| | | | 296/26.09 |
| 7,712,811 B2 | 5/2010 | Heaman et al. | |
| 9,452,782 B1 * | 9/2016 | Singer | B62D 21/14 |
| 9,481,316 B2 * | 11/2016 | Faruque | B60R 9/06 |
| 9,926,018 B2 * | 3/2018 | Spahn | B62D 33/0273 |
| 9,969,444 B2 * | 5/2018 | Loew | B62D 33/0273 |
| 2010/0026027 A1 * | 2/2010 | Gao | B62D 33/0273 |
| | | | 296/26.11 |
| 2015/0225024 A1 * | 8/2015 | Newberry | B62D 33/0273 |
| | | | 296/26.11 |
| 2016/0185396 A1 * | 6/2016 | Castillo | B62D 33/0273 |
| | | | 296/26.11 |
| 2016/0200260 A1 * | 7/2016 | Faruque | B60R 9/06 |
| | | | 296/37.6 |

* cited by examiner

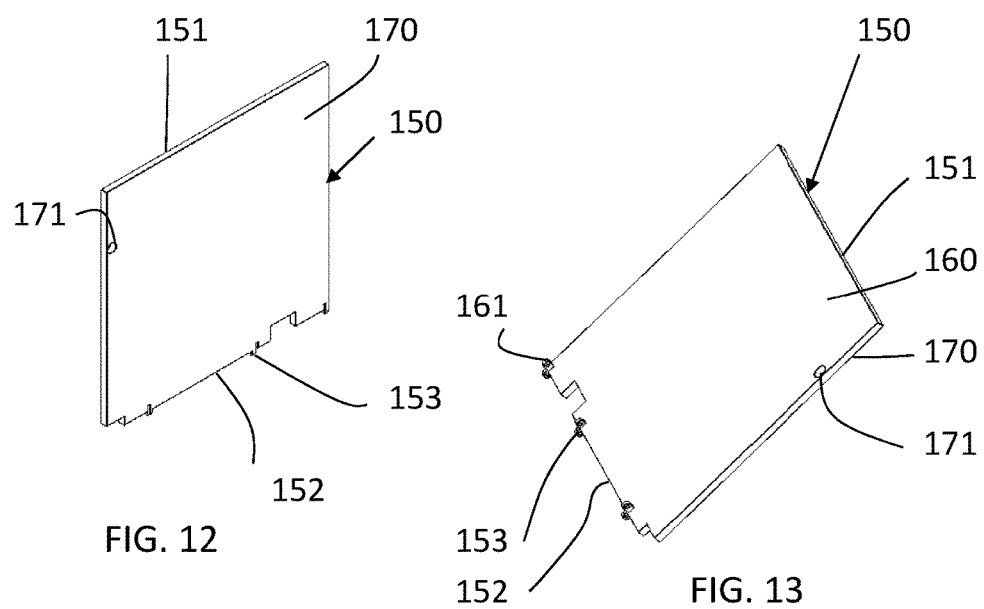
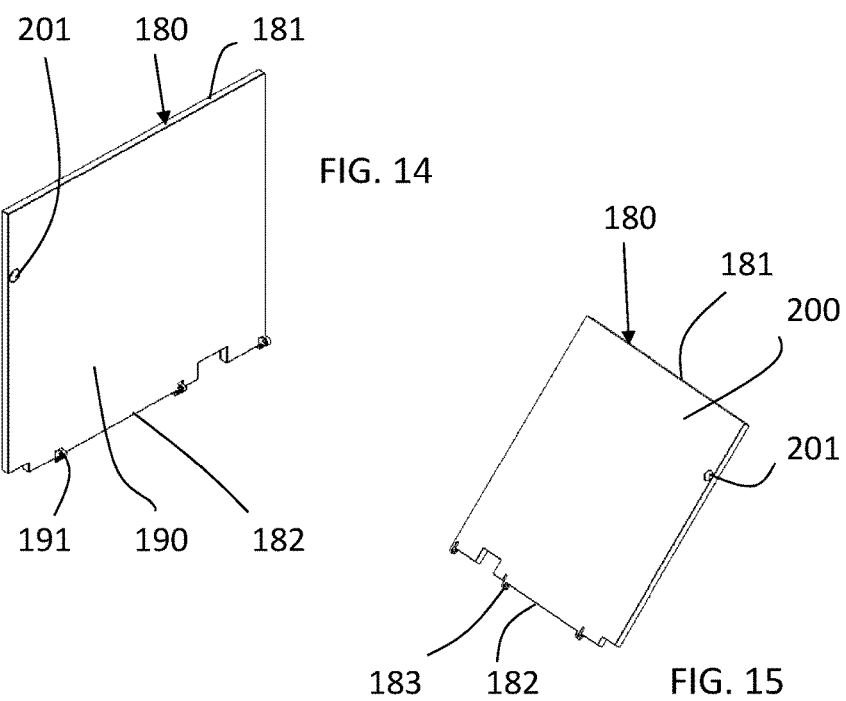

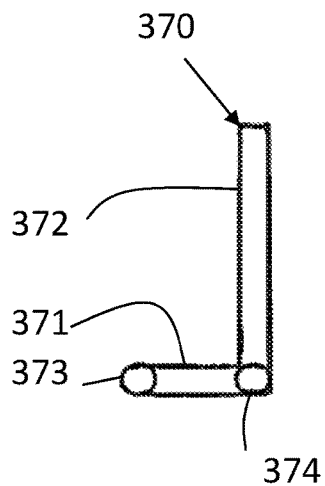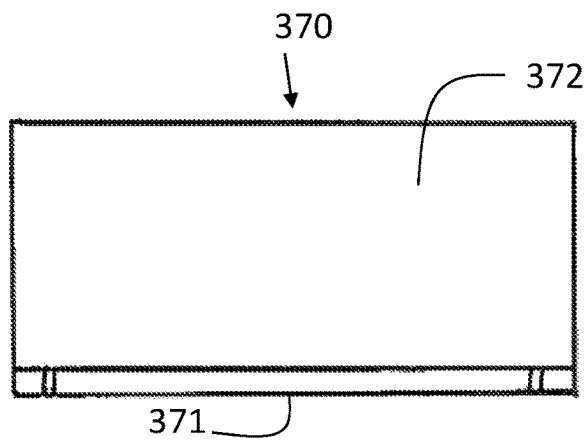
FIG. 33       FIG. 34
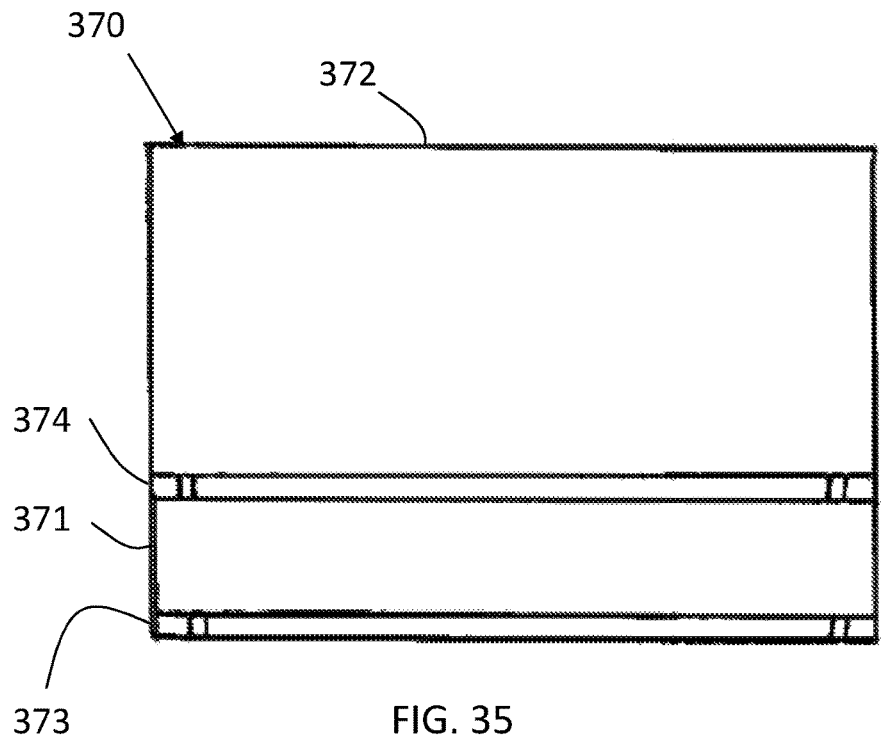
FIG. 35

TAILGATE WITH MOVABLE SUPPORT PLATE

This United States utility patent application claims priority on and the benefit of provisional application 62/192,050 filed Jul. 13, 2015, the entire contents of which are hereby incorporated herein by reference.

BACKGROUND OF THE INVENTION

1. Field of the Invention

The present invention relates to a tailgate, and in particular to an improved tailgate having a support plate that is movable to a raised position.

2. Description of the Related Art

Trucks typically have tailgates at the distal end of the truck bed. Many adaptations and extensions have been developed over the years. Several examples include:

United States Patent Number ("USPN") U.S. Pat. No. 4,472,639 to Bianchi is titled Tailgate Attachment for Extending the Cargo Space of Vehicles.

U.S. Pat. No. 5,469,038 to Sauri is titled Multiple Configuration Tailgate Extender.

U.S. Pat. No. 5,732,995 to Piccariello is titled Tailgate Extender.

U.S. Pat. No. 5,741,039 to Habdas is titled Cargo Box Extending Tailgate Utilizing a Two Panel/Intermeshing Design.

U.S. Pat. No. 5,775,759 to Cummins is titled Vehicle Bed Extender.

U.S. Pat. No. 5,788,311 to Tibbals is titled Combination Step and Cargo Base Extender.

U.S. Pat. No. 5,902,000 to Wold is titled Vehicle Bed Extender.

U.S. Pat. No. 5,975,608 to Jarman is titled Apparatus for Extending Vehicle Cargo Areas.

U.S. Pat. No. 6,007,127 to Garofalo is titled Tailgate Cargo Container.

U.S. Pat. No. 6,113,171 to Stearns is titled Tailgate Extender.

U.S. Pat. No. 6,364,392 to Meinke is titled Tailgate Extender.

U.S. Pat. No. 6,550,841 to Burdon et al. is titled Tailgate Nested Tailgate Bed Extender.

U.S. Pat. No. 6,932,404 to Vejnar is titled Retractable Auxiliary Tailgate.

U.S. Pat. No. 6,988,756 to Meinke et al. is titled Modular Extender Tailgate.

U.S. Pat. No. 6,994,363 to Seksaria et al. is titled Tailgate Extension.

U.S. Pat. No. 6,994,389 to Graffy et al. is titled Universal Truck Bed Extender.

U.S. Pat. No. 7,021,689 to Weisbeck, III is titled Vehicle Bed Extension Device.

U.S. Pat. No. 7,128,380 to Nagle is titled Tailgate Extender Systems.

U.S. Pat. No. 7,226,100 to Willey et al. is titled Vehicle Bed Extender.

U.S. Pat. No. 7,287,798 to King is titled Tailgate Assembly and Method of Operating the Same.

U.S. Pat. No. 7,712,811 to Heaman et al. is titled Integrated Ratcheting Tailgate Extender.

While the products shown in each of these references may work well for their intended purposes, none show the novel features of the present invention.

Thus there exists a need for an improved tailgate with movable support plate that solves these and other problems.

SUMMARY OF THE INVENTION

The present invention relates to a tailgate, and in particular to an improved tailgate having a support plate that is movable to a raised position. The tailgate has a body that mounts to a truck bed in a conventional manner. The body has a cavity. When in a storage position, an extension plate, a first side plate, a second side plate and a support plate are contained within in the cavity. When in a deployed or extended position, the extension plate is rotated relative to the body, the side plates are pivoted up and the support plate is raised within the cavity. The support plate can be raised and lowered automatically as the side plates are swung open and closed.

According to one advantage of the present invention, the support plate is a movable support plate. In this regard, in the storage position, the support plate is at the bottom of the cavity. However, in the raised position, the support plate is at the top of the cavity and is generally flush with the extension plate and truck bed.

According to another advantage of the present invention, the support plate automatically raises and lowers as the side plates are swung open and closed. In this regard, the support plate is moved to its intended position as the extension is being set up without additional steps.

According to further advantage of the present invention, the support plate has slots. This allows for a pin to travel within the slots as the side plates are swung open and closed. The side plates have eyelets (lifting eyelets) for the support plate that swing in an orbital path about the pivot axis of the pivoting eyelets. Yet, the support plate raises and lowers in a vertical manner as the pins float within the respective slots.

According to a still further advantage of the present invention, the side plates are supported when in an open position by being connected to the closing rods of the truck.

According to a still further advantage of the present invention, the body has a lip that prevents the extension plate from over-rotating relative to the body when in the open position.

According to a still further advantage of the present invention in an alternative embodiment, a drop in frame can be provided for use with a shell. The shell could be capped when not used with the present invention.

According to a still further advantage yet of the present invention, the support plate is a self-storing plate that is hidden from view when not in use. The extender is always available for use when desired yet takes up little or no additional space when stowed.

According to an advantage of an alternative embodiment, the extension plate can be hinged whereby it can further extend the cargo area. As truck beds are shortened, this feature allows for an up to eight foot long cargo area even in a short box truck.

Other advantages, benefits, and features of the present invention will become apparent to those skilled in the art upon reading the detailed description of the invention and studying the drawings.

BRIEF DESCRIPTION OF THE DRAWINGS

FIG. 12 is a perspective view of a first side plate.

FIG. 13 is an alternative view of the first side plate illustrated in FIG. 12.

FIG. 14 is a perspective view of a second side plate.

FIG. 15 is an alternative view of the second side plate illustrated in FIG. 14.

FIG. 33 is a side view of an alternative embodiment of an extender plate.

FIG. 34 is an end view of the embodiment illustrated in FIG. 33.

FIG. 35 is similar to FIG. 34, but instead illustrates the embodiment shown flat.

DETAILED DESCRIPTION OF PREFERRED EMBODIMENTS

Figure 1:
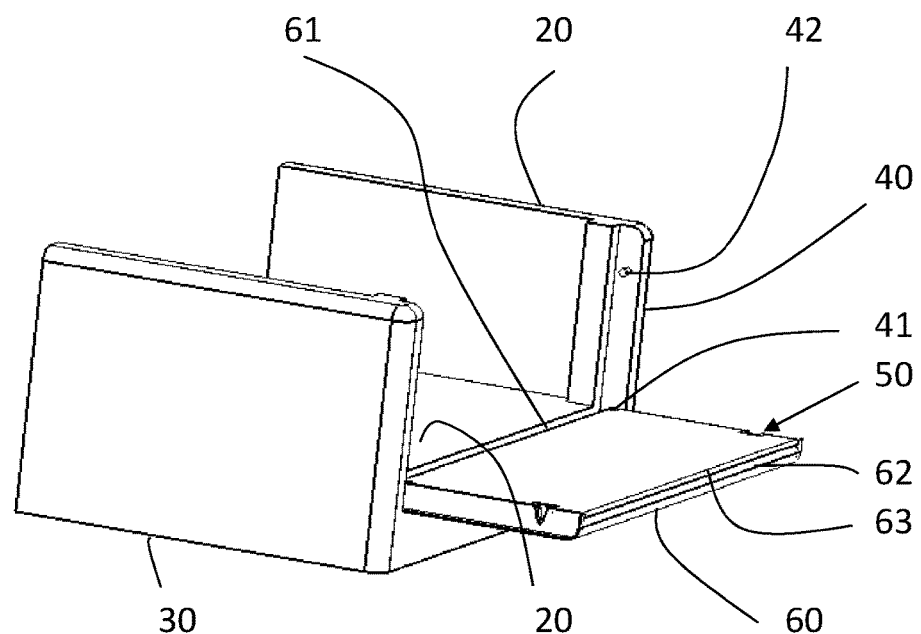
FIG. 1 is a perspective view of an embodiment of the present invention connected to a truck bed shown in a closed or retracted position.
Figure 2:
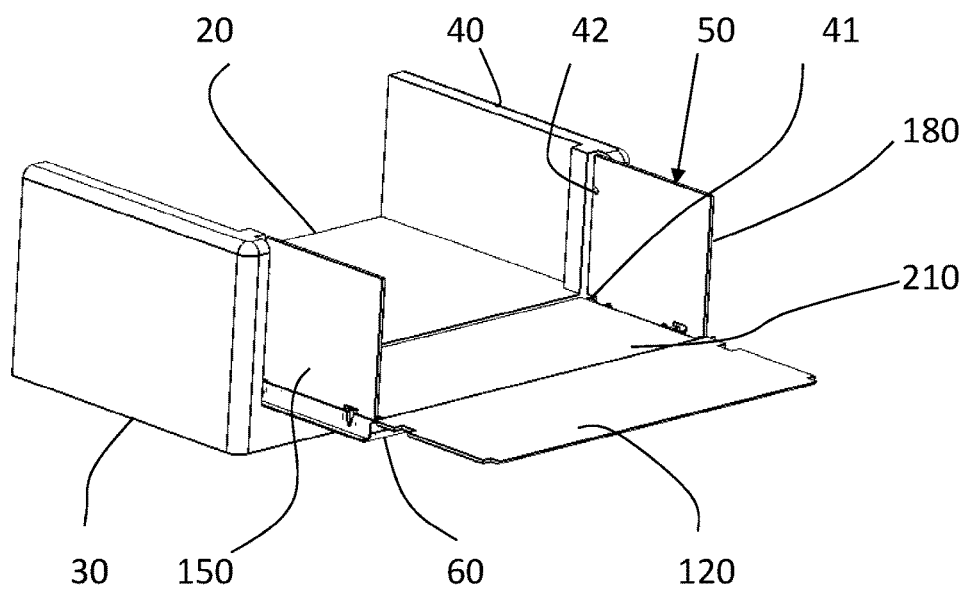
FIG. 2 is similar to FIG. 1, but alternatively shows the tailgate in the extended position.
Figure 3:
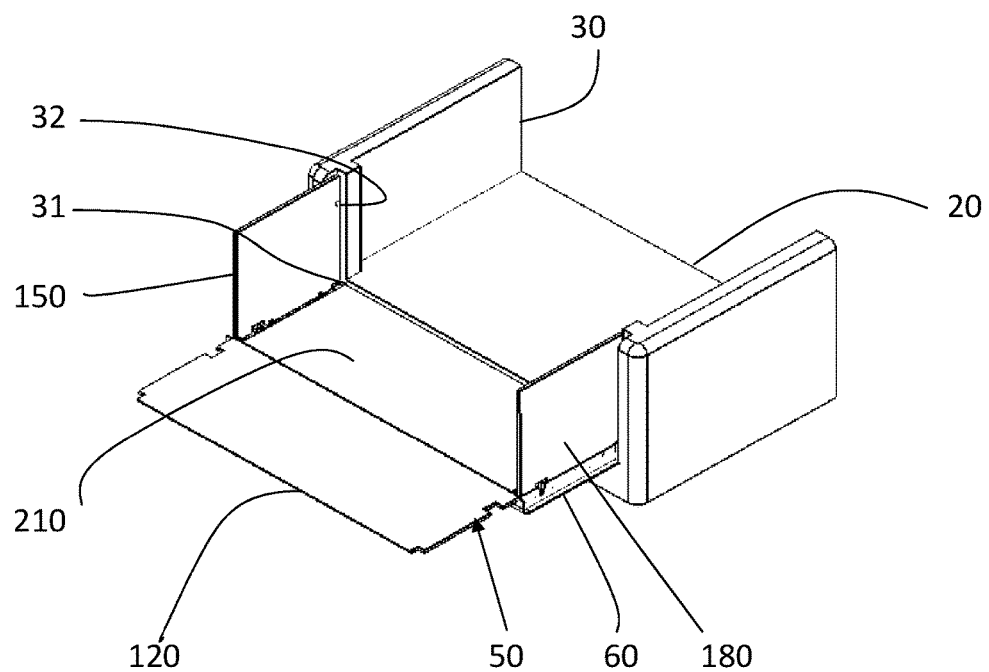
FIG. 3 is an alternative view of the embodiment illustrated in FIG. 2.
Figure 4:
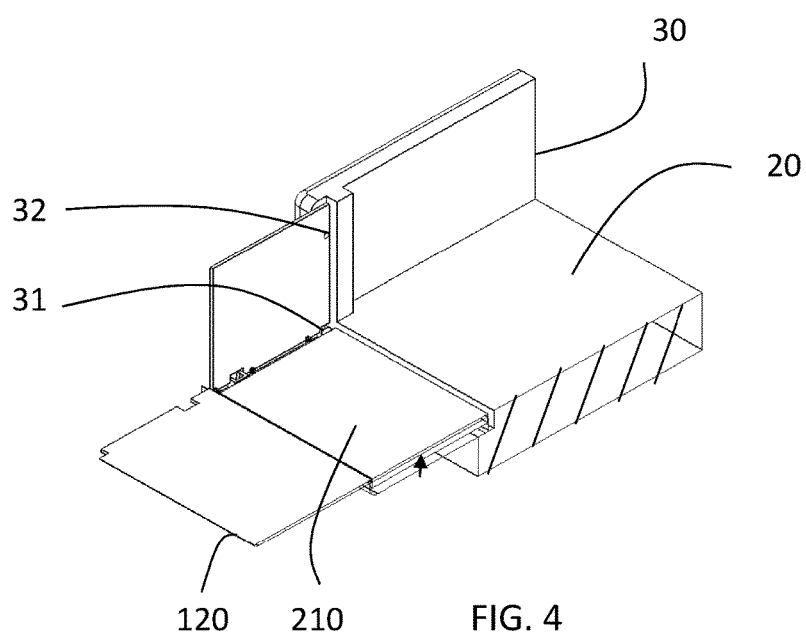
FIG. 4 is a cross-sectional view taken along line 4-4 in FIG. 3.
Figure 5:
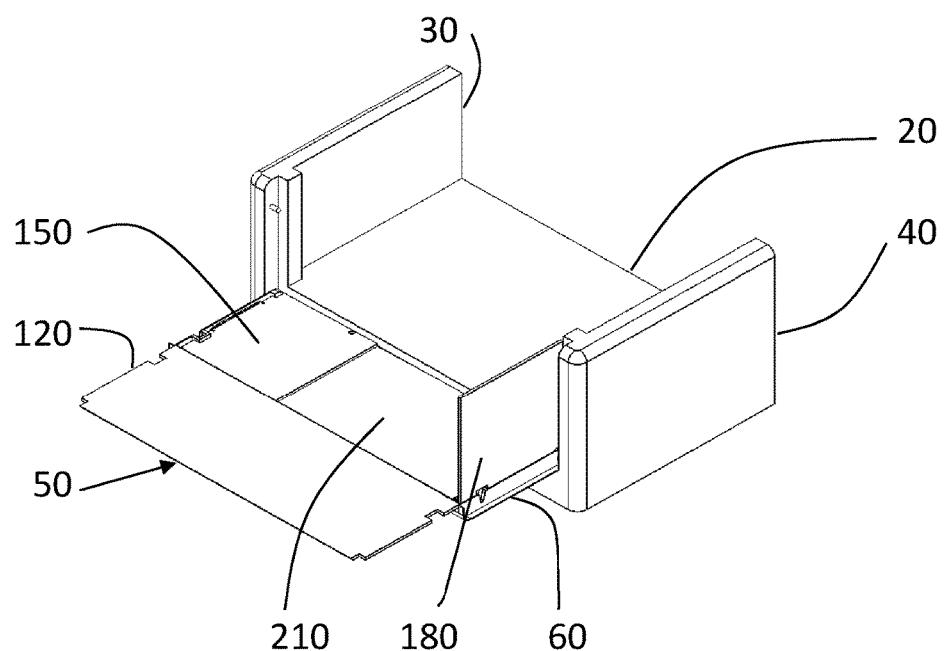
FIG. 5 is a perspective view showing one side plate open and one side plate lowered.
Figure 6:
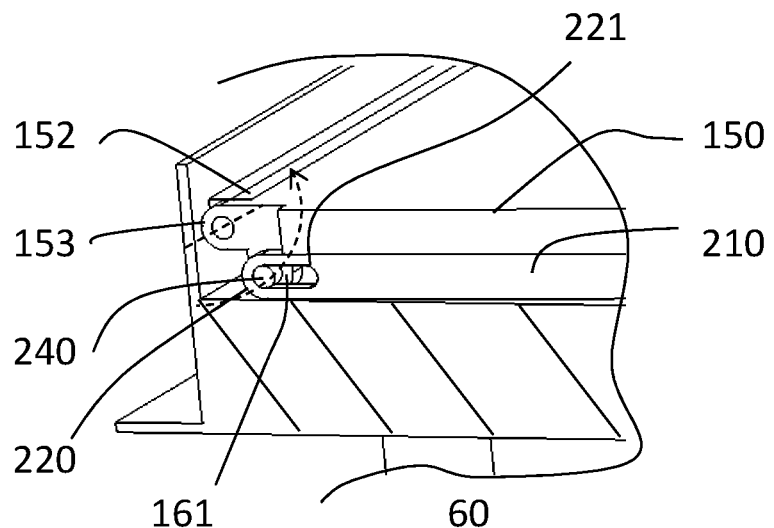
FIG. 6 is a close-up view showing the support plate in a lowered position.
Figure 7:
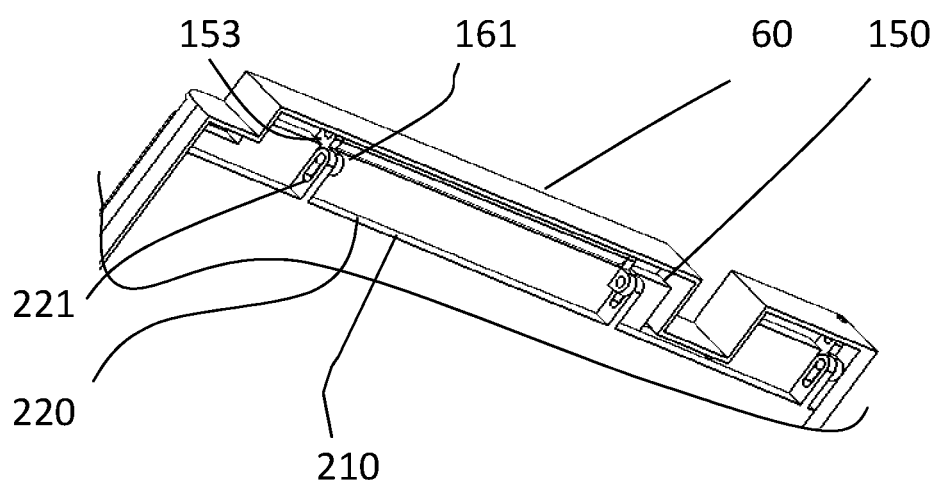
FIG. 7 is an alternative view of the support plate in a lowered position.
Figure 8:
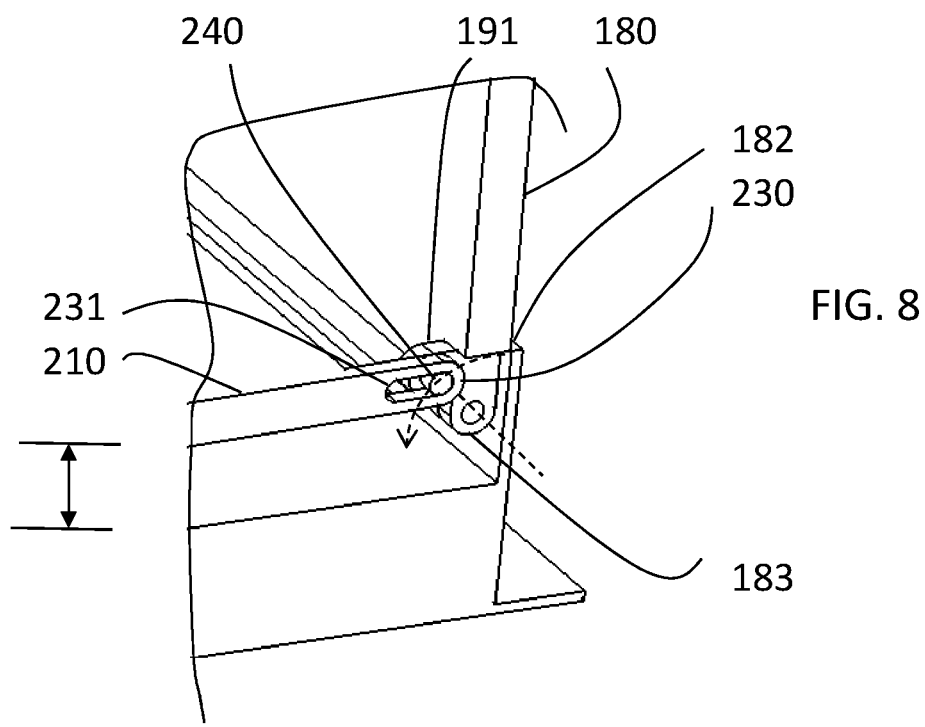
FIG. 8 is a close-up view showing the support plate in a raised position.
Figure 9:
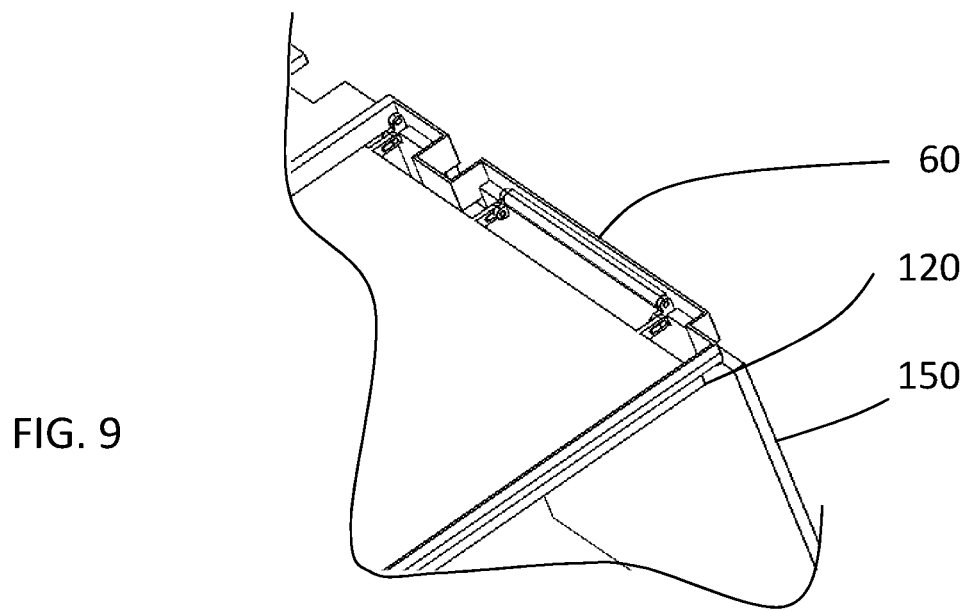
FIG. 9 is an alternative view of the support plate in a raised position.
Figure 10:
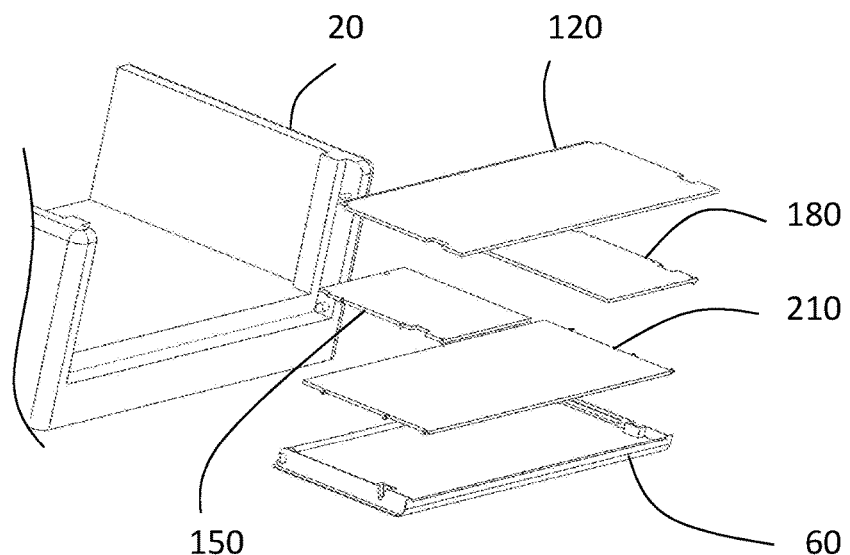
FIG. 10 is an exploded view of the present invention in a closed position.
Figure 11:
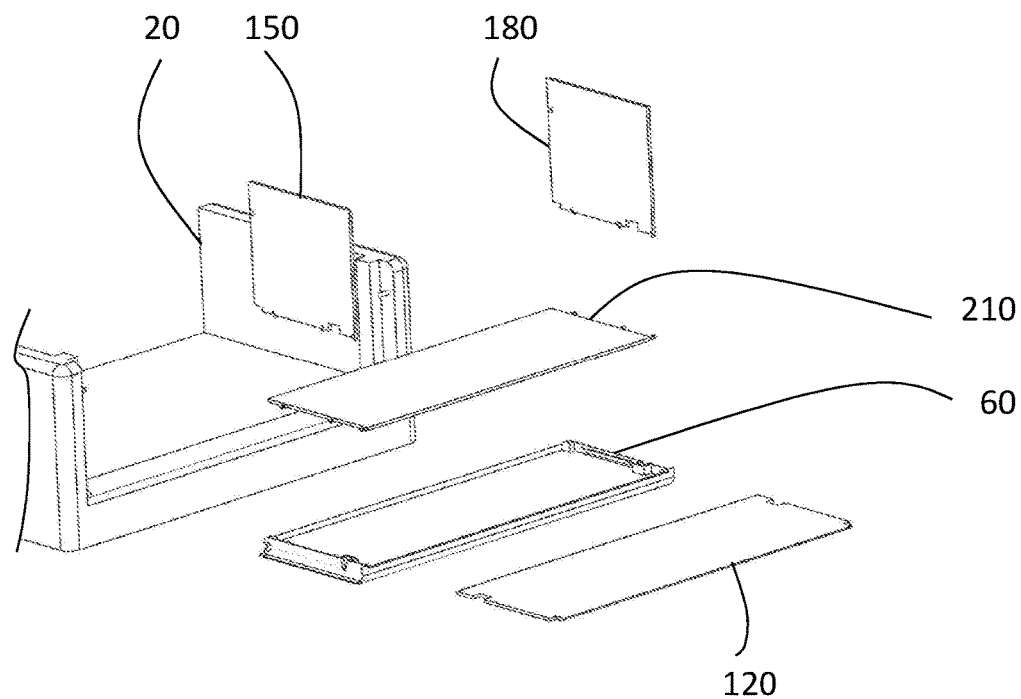
FIG. 11 is an exploded view of the present invention in an open or extended position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Turning now to FIGS. 1-22, it is seen that a first embodiment of a tailgate 50 is provided.

The tailgate 50 is used with a bed 20 of a truck as illustrated in FIGS. 1-5 and 10-11. The truck has a bed 20, a first sidewall 30 and a second sidewall 40. The first sidewall 30 has a connecting rod 31 and a closing rod 32. The second sidewall 40 has a connecting rod 41 and a closing rod 42. The connecting rods are used to pivotally connect the tailgate 50 to the truck. The closing rods are used to secure the tailgate 50 in an upright position at the distal or back end of the truck. The tailgate 50 is connected to the truck in the conventional manner.

The tailgate 50 has a body 60, an extension plate 120 (alternatively called end plate), a first side plate 150, a second side plate 180 and a support plate 210. Each of these components is described below.

Figure 20:
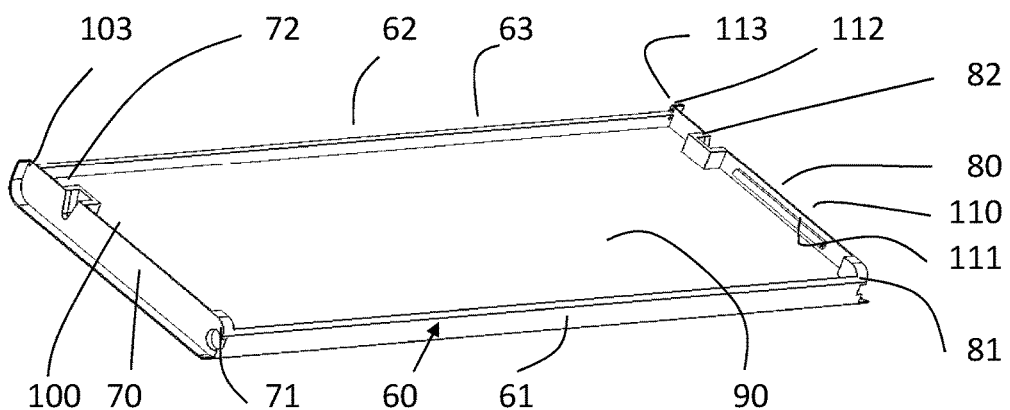
FIG. 20 is a perspective view of a body.
Figure 21:
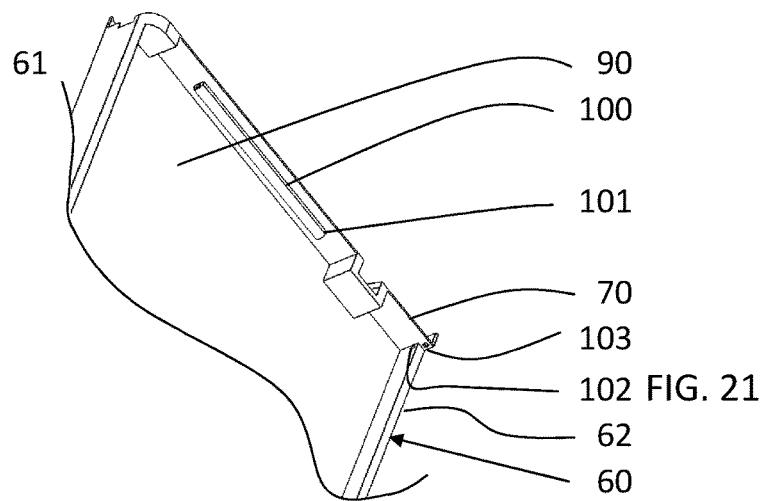
FIG. 21 is a close-up view of a portion of the body.
Figure 22:
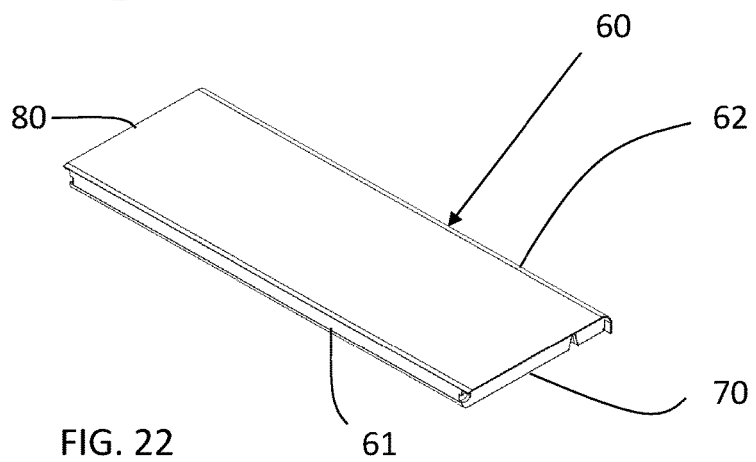
FIG. 22 is an alternative view of the body illustrated in FIG. 20.
Figure 23:
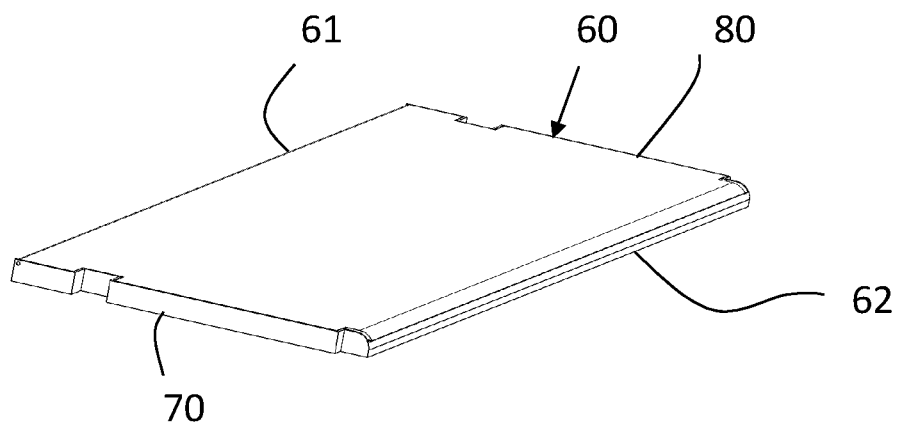
FIG. 23 is a perspective view of an alternative embodiment of the present invention.
Figure 24:
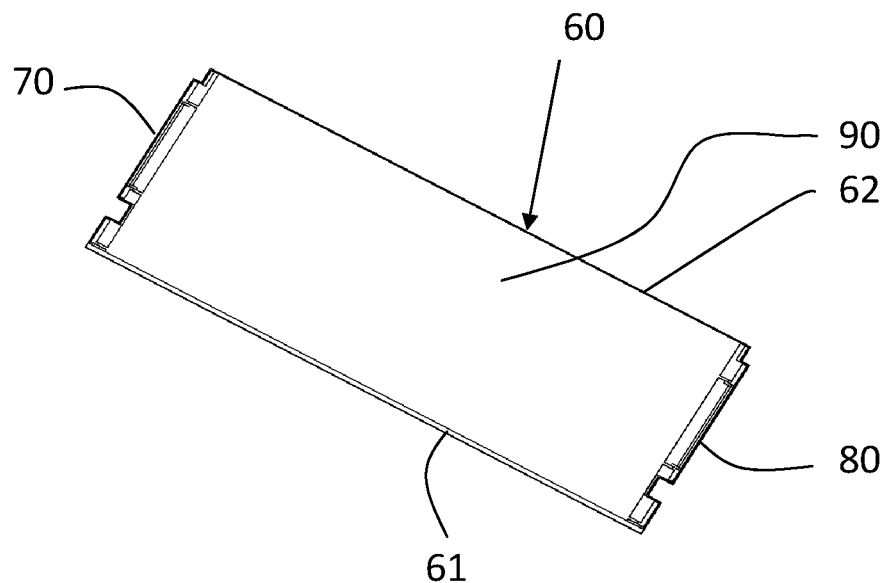
FIG. 24 is an alternative view of the embodiment illustrated in FIG. 23.
Figure 25:
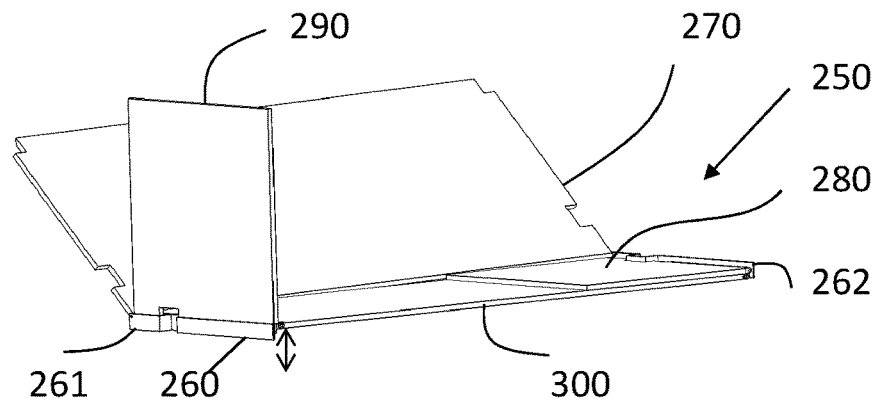
FIG. 25 is a view showing one side plate of the assembly open.
Figure 26:
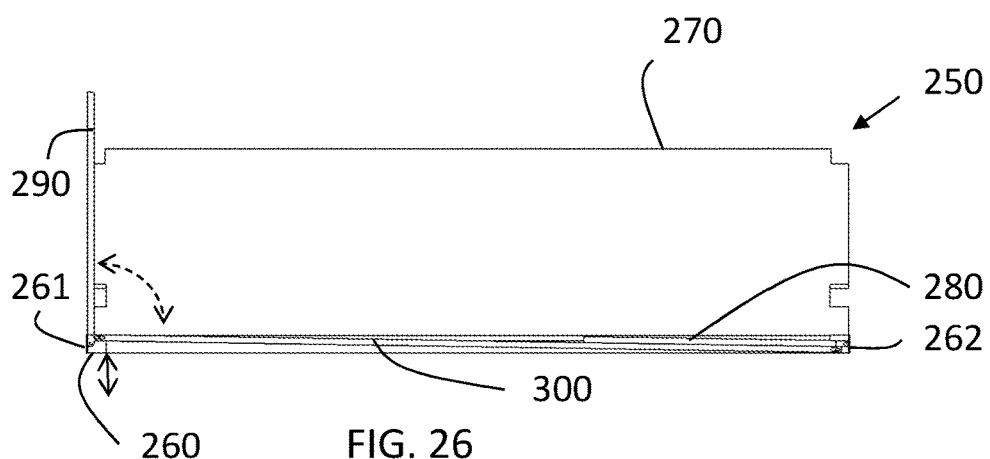
FIG. 26 is an end view of position of the assembly as illustrated in FIG. 25.
Figure 27:
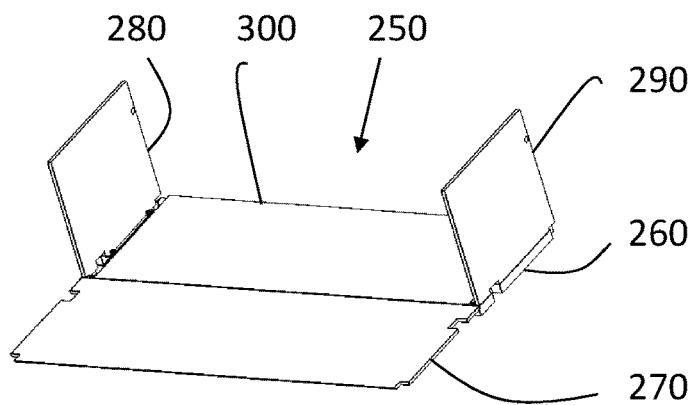
FIG. 27 is a view showing both sides plates of the assembly open.
Figure 28:
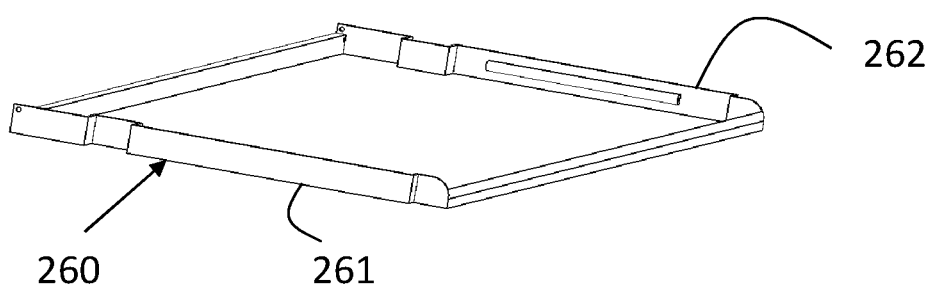
FIG. 28 is a perspective view of a frame.
Figure 29:
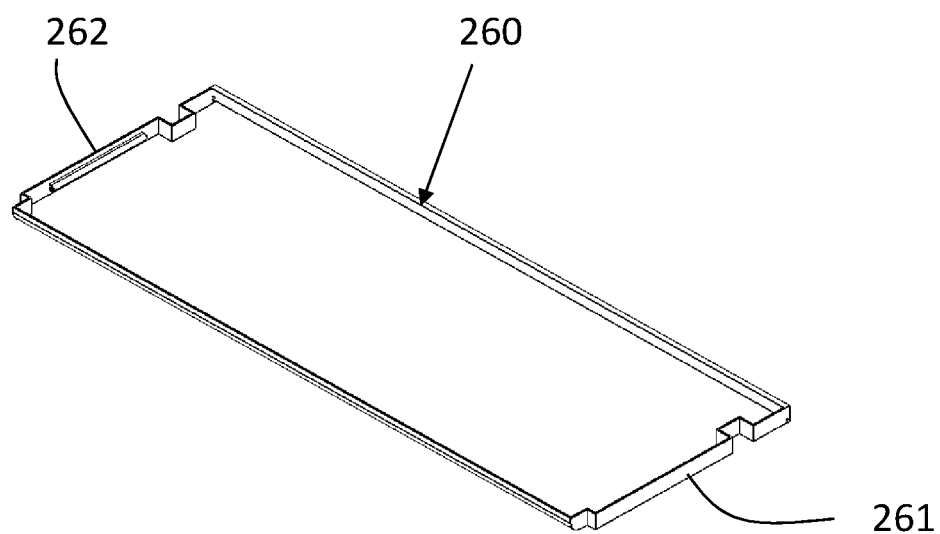
FIG. 29 is an alternative perspective view of the frame illustrated in FIG. 28.
Figure 30:
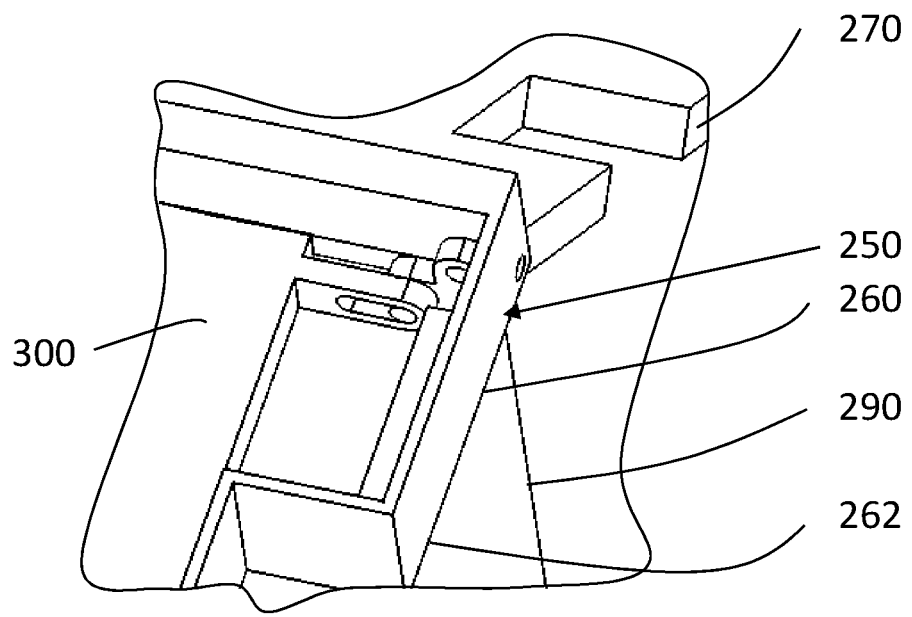
FIG. 30 is a close-up view of the assembly in an open position.
Figure 31:
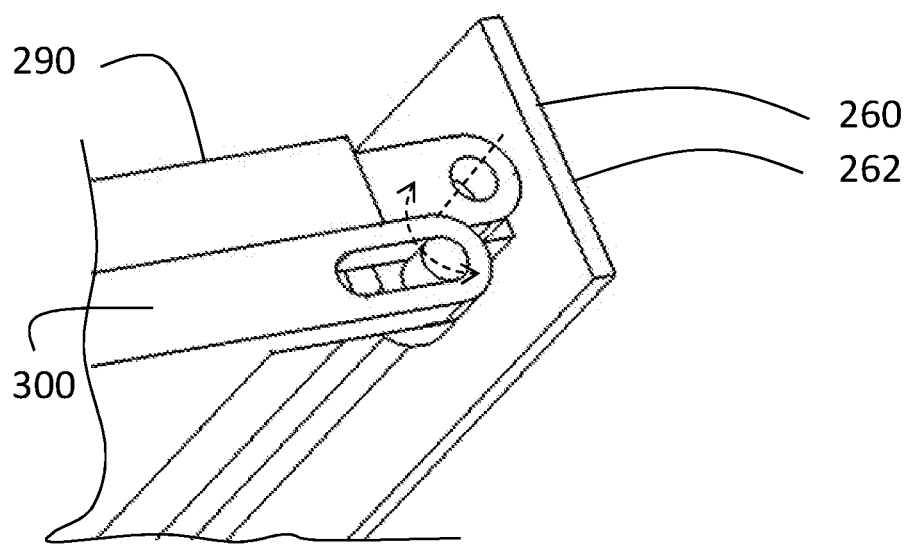
FIG. 31 is a close-up view of the assembly in a closed position.

The body 60, as seen in FIGS. 20-22, has a first end 61 pivotally connectable to the truck bed 20 and a second end 62 remote from or distal to the first end 61. The body forms an outer shell viewable when the tailgate is in the closed position. A lip or ledge 63 is at the remote second end 62. The body 60 has a first side 70 with a pivot 71 for being pivotally connected to the connecting rod 31 and a latch 72 for being removably fastened to the closing rod 32. The body 60 further has a second side 80 with a pivot 81 for being pivotally connected to the connecting rod 41 and a latch 82 for being removably fastened to the closing rod 42. A cavity 90 is formed on one face of the body. The cavity 90 has a first side 100 and a second side 110. The first side 100 has a pivot tube 101, a pivot hole 102 and a pivot hole 103. The second side 110 has a pivot tube 111, a pivot hole 112 and a pivot hole 113. Pivot tubes 101 and 111 are elongated tubes each having a centrally aligned hole passing there through, through which an elongated pin is received (and extends out of both ends).

Figure 16:
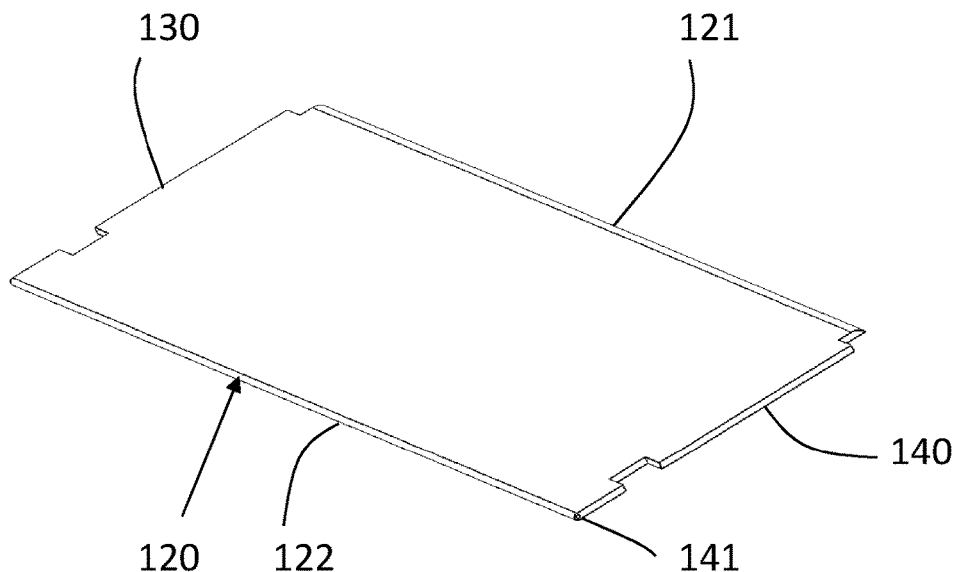
FIG. 16 is a perspective view of an extension plate.
Figure 17:
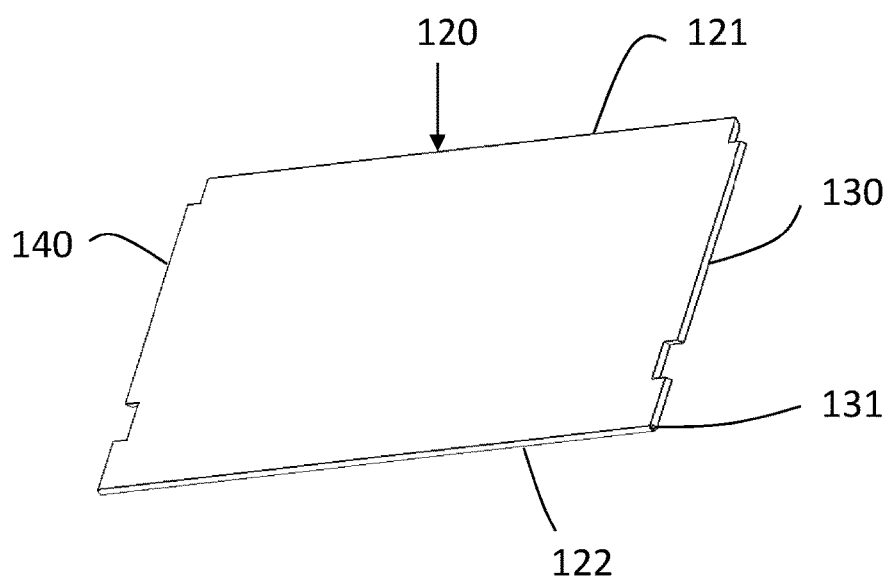
FIG. 17 is an alternative view of the extension plate illustrated in FIG. 16.

The extension plate 120 (or extender plate or end plate), as seen in FIGS. 16-17, has a first end 121 and a second end 122. A first side 130 having a first pin hole 131 is provided. A second side 140 having a pin hole 141 is also provided.

Side plate 150, as seen in FIGS. 12-13, has a first end 151 and a second end 152. Eyelets 153 are at the edge of end 152. Eyelets 161 are also provided on a side 160 near the end 152. A second side 170 is further provided. A through hole 171 is provided as passes between sides 160 and 170. Eyelets 153 and 161 have generally circular holes there through.

Side plate 180, as seen in FIGS. 14-15, has a first end 181 and a second end 182. Eyelets 183 are at the edge of end 182.

Eyelets 191 are also provided on a side 190 near the end 182. A second side 200 is further provided. A through hole 201 is provided as passes between sides 190 and 200. Eyelets 183 and 191 have generally circular holes there through.

Side plates 150 and 180 are lifter plates or cams. Eyelets 153 and 183 are pivoting eyelets (connecting plates 150 and 180 to the body, respectively). Eyelets 161 and 191 are lifting eyelets that lift support plate 210 (camming effect) as the respective side plates are opened from the lowered position to the raised position. Lifting eyelets move in arc-shaped paths, the arcs having a radius that define an arc about the pivoting axis of the pivoting eyelets.

Figure 18:
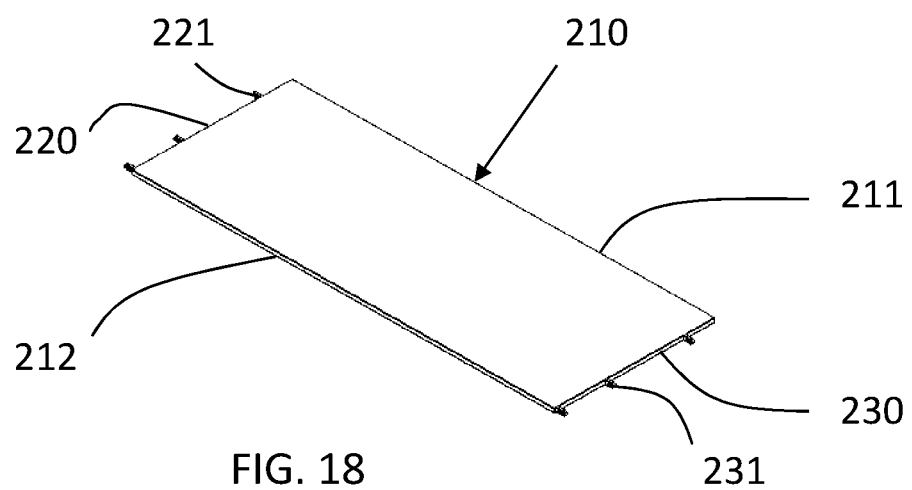
FIG. 18 is a perspective view of a support plate.
Figure 19:
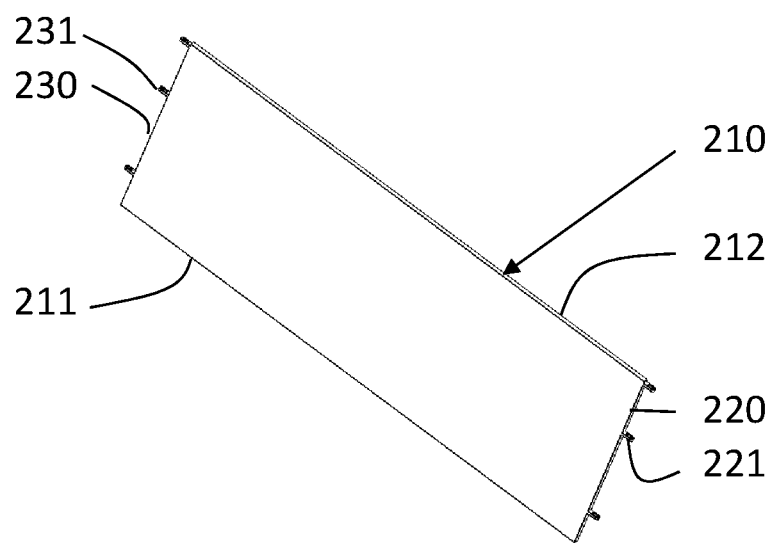
FIG. 19 is an alternative view of the support plate illustrated in FIG. 18.

Support plate 210, as seen in FIGS. 18-19, has a first end 211 and a second end 212. A first side 220 is provided having three slotted structures with slots 221 extending therefrom. A second side 230 having three slotted structures with slots 231 extending therefrom is also provided.

Turning now to the operation of the tailgate 50, it is first noted that the extension plate 120 is pivotally connected to the body 60. This is accomplished with pins. A pin is received within hole 103 and within hole 131. Similarly, a pin is received within hole 113 and hole 141. These two pins are preferably collinear and accordingly define a single pivot axis. The extension plate 120 is generally pivotable approximately 180 degrees from a stored position to an extended position. The lip 63 contacts the extension plate to prevent rotation past approximately 180 degrees relative to the body.

The first side plate 150 is pivotally connected to the body 60. This is accomplished as an elongated pin passes through pivot tube 101 and two eyelets 153, and also a pin connects a third eyelet 153 to hole 102. The hole 171 receives the closing rod 32 when the first side plate is swung to the upwards position to secure the first side plate in the upright position.

The second side plate 180 is pivotally connected to the body 60. This is accomplished as an elongated pin passes through pivot tube 111 and two eyelets 183, and also a pin connects a third eyelet 183 to hole 112. The hole 201 received the closing rod 42 when the second side plate is swung to the upwards position to secure the second side plate in the upright position.

The operation of the side plates 150 and 180 are independent of each other, and also both plates are independently movable once the extension plate is moved to the extended position.

The support plate 210 is connected to both the first side plate 150 and the second side plate 180. Pins 240 are received in eyelets 161 and the slots 221 respectively to pivotally connect the first side plate and the support plate in a cam type arrangement. Further, pins 240 are received in the eyelets 191 and the slots 231 respectively to pivotally connect the second side plate and the support plate. The eyelets 161 and 191 pass in an orbital path as the respective plates are swung from the storage position to the upright position. The pins accordingly move in the same path as the respective eyelets.

Yet, the support plate moves generally vertically as the pins each can move within slots as the side plates are swung. In this regard, any horizontal travel of the pins within the slots does not affect the general vertical movement of the support plate.

Figure 32:
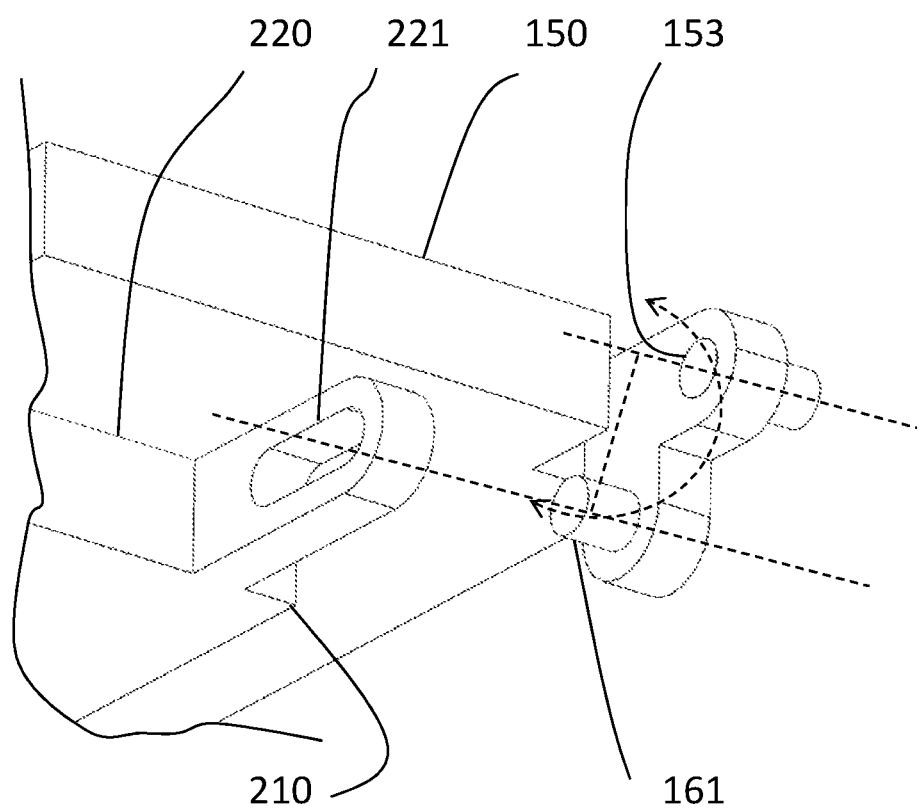
FIG. 32 is an exploded view showing the alignment of a side plate and the support plate about a pivot axis.
Figure 36:
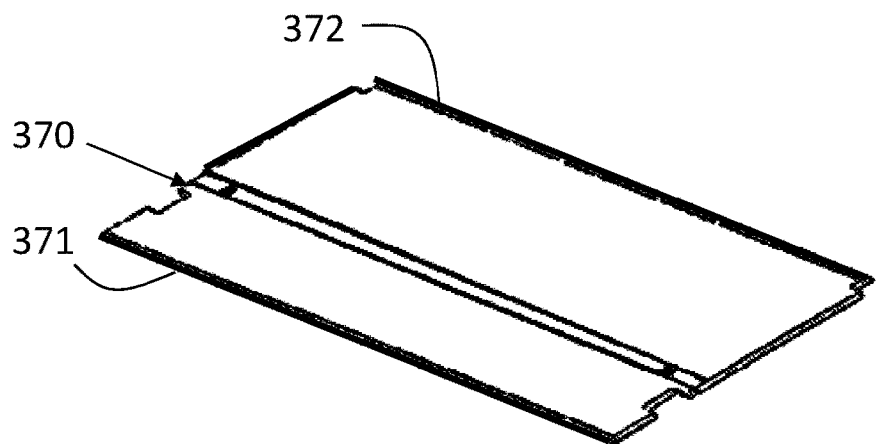
FIG. 36 is a perspective view of the embodiment illustrated in FIG. 35.
Figure 37:
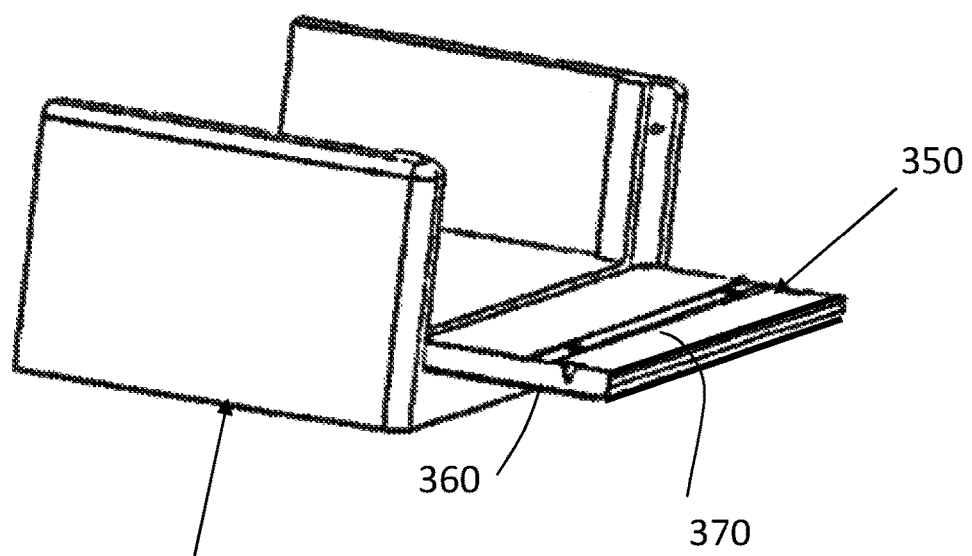
FIG. 37 is a perspective view of the alternative extender plate in position in a tailgate in a storage position.
Figure 38:
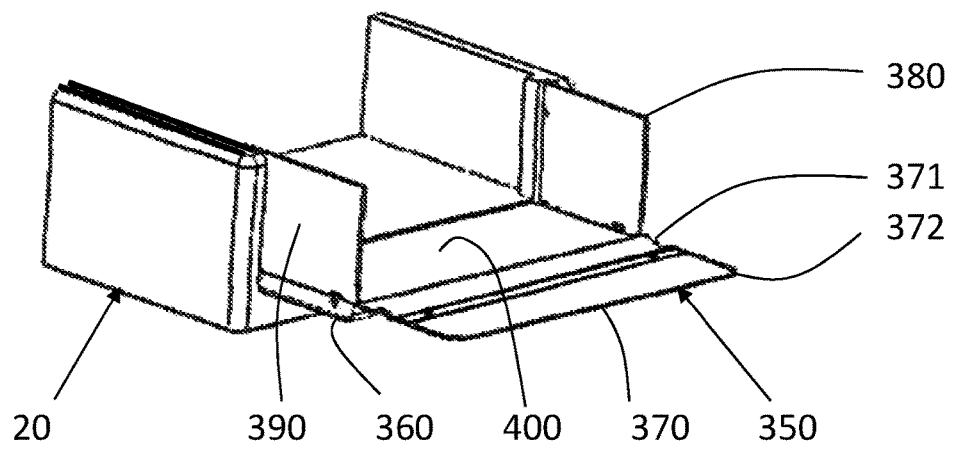
FIG. 38 is similar to FIG. 37, but is alternatively shown in an extended position.
Figure 39:
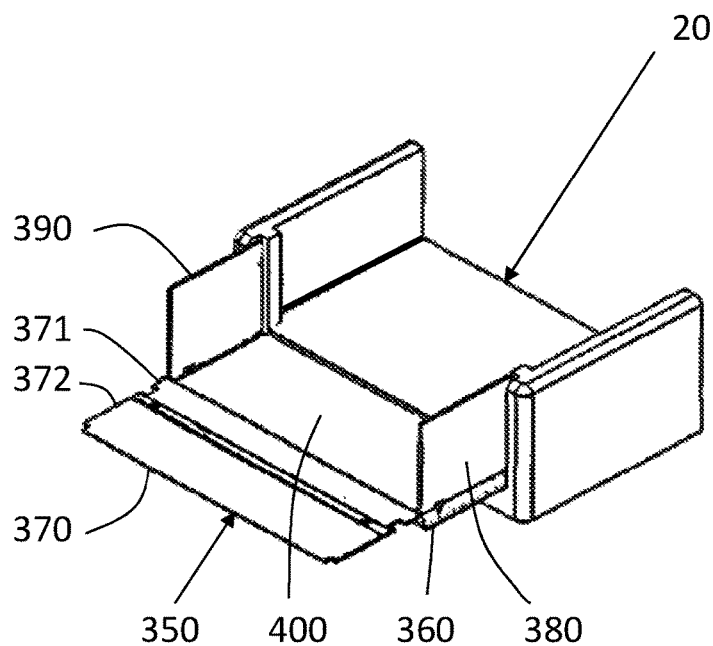
FIG. 39 is an alternative view of the embodiment illustrated in FIG. 38.
Figure 40:
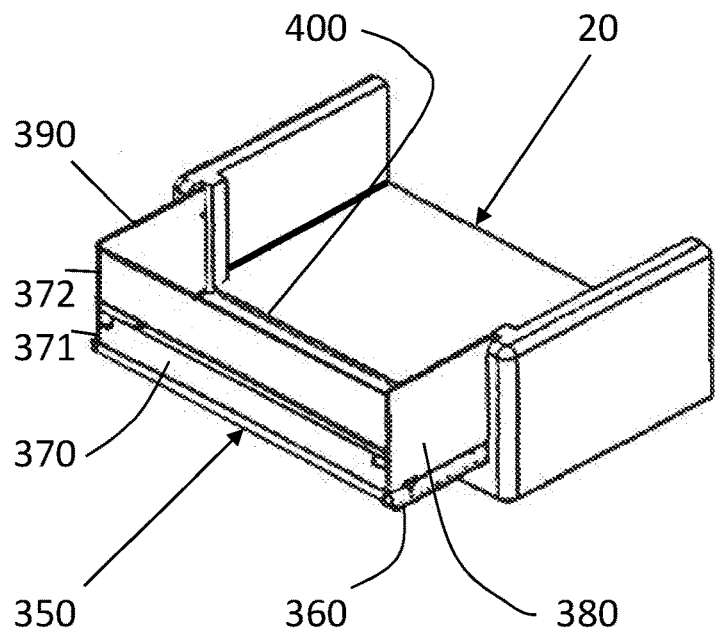
FIG. 40 is similar to FIG. 39 but shows the extender plate pivoted vertically in a first position wherein a second piece of the extension plate is adjacent the side plates.
Figure 41:
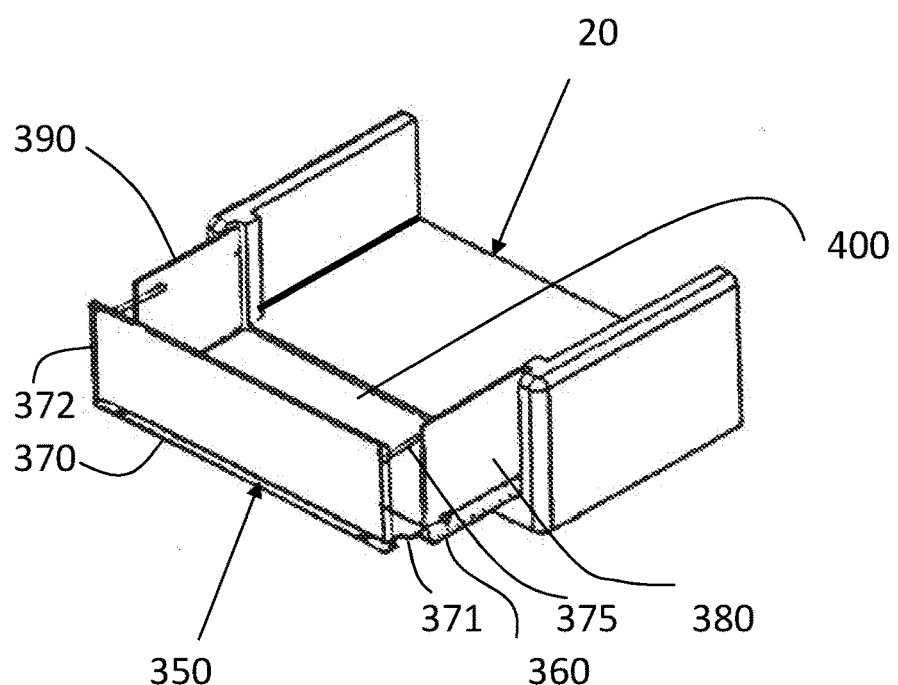
FIG. 41 is similar to FIG. 40 but shows the extender plate pivoted vertically in a second position wherein the second piece of the extender plate is in an extended position separated from the side plates.

FIG. 32 illustrates the relationship between side plate 150 and the support plate 210 in an exploded view.

In an alternative embodiment, the support plate could have a single slot at one end and a round hole at the other end. In this type of embodiment, the slot could be elongated to allow for greater horizontal travel of the pin, yet both ends (slot and round hole) would retain the camming effect without departing from the broad aspects of the present invention.

When both side plates 150 and 180 are placed in the upright position and fastened to the respective closing rods of the truck, the support plate 210 is moved to an upper position wherein it is generally planar with the extension plate 120 and the truck bed.

Turning now to FIGS. 23-31, it is seen that an alternative embodiment of the present invention is illustrated. The tailgate 250 has a frame 260 with sides 261 and 262, an extender plate 270, a side plate 280, a second side plate 290 and a support plate 300. The main difference between this embodiment and the previously described embodiment is that this embodiment is designed to drop into a shell of a tailgate. In this regard, if an end use does not desire to make use of an extension, the shell can be simply capped and the tailgate can function as a traditional tail gate. However, if an extender is desired, then the frame and other components can be dropped into the shell and it can then be used to achieve the advantages of the present invention.

Turning now to FIGS. 33-41, it is seen that a further preferred embodiment of the present invention is illustrated. In particular, a tailgate 350 is shown having a frame 360, an extender plate 370, a first side plate 380, a second side plate 390 and a support plate 400. The extender plate 370 has a first piece 371 and a second piece 372. The first piece 371 is pivotally connected to the frame 360 with a pivot 373. In this regard, a hinge is provided to accomplish the pivot. The second piece 372 is pivotally connected to the first piece 371 with a pivot 374. In this regard, the second piece 372 can be rotated relative to the first piece.

The extender plate 370 can operate similarly to the extender plates described above but with added functionality. Specifically, comparing FIGS. 41 and 42, it is seen how the extender plate can further extend the length of the cargo area of a truck. This is accomplished by having the first piece 371 be in a plane generally parallel to a support plate plane, and the by pivoting the second piece to be generally perpendicular to the first piece. Straps 375 are provided for securing the second piece to the side plates 380 and 390 to secure the second piece 372 in a generally upright manner.

Thus it is apparent that there has been provided, in accordance with the invention, an improved tailgate with movable support plate that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A tailgate comprising:
 a body having a cavity;
 an extension plate, said extension plate being pivotably connected to said body;
 a first side plate pivotally connected to said body;
 a second side plate pivotally connected to said body; and
 a support plate, said support plate having a support plate first end and a support plate second end, said support plate first end being pivotally connected to said first side plate and said support plate second end being pivotally connected to said second side plate,
 wherein:

said support plate first end is raised from a support plate first end lowered position within said cavity under operation of said first side plate as said first side plate moves to a first side plate upright position; and said support plate second end is raised from a support plate second end lowered position within said cavity under operation of said second side plate as said second side plate moves to a second side plate upright position.

2. The tailgate of claim 1 wherein:
said support plate has a support plate top;
said extension plate is pivotable to a deployed position, said extension plate having a deployed upper surface when in said deployed position; and
said support plate top is generally flush with said deployed upper surface of said extension plate when said support plate is in a raised position.

3. The tailgate of claim 1 wherein said support plate comprises a first slot and a second slot.

4. The tailgate of claim 3 wherein:
said first side plate has a first side plate eyelet, said first side plate eyelet having a first side plate eyelet axis;
said second side plate has a second side plate eyelet, said second side plate eyelet having a second side plate eyelet axis;
said first side plate eyelet axis being parallel to said second side plate eyelet axis;
a first pin connects said first side plate eyelet to said first slot; and
a second pin connects said second side plate eyelet to said second slot.

5. The tailgate of claim 4 wherein:
said first side plate eyelet passes in an orbital path as said first side plate is moved to a first side plate upwards position;
said second side plate eyelet passes in an orbital path as said second side plate is moved to a second side plate upwards position.

6. The tailgate of claim 1 wherein said extension plate and said support plate are contained within a drop-in frame.

7. The tailgate of claim 1 wherein said extension plate comprises a first piece and a second piece, said first piece being pivotal relative to said second piece.

8. A tailgate comprising:
a body with a cavity;
an extension plate, said extension plate being pivotably connected to said body wherein said extension plate is pivotably movable to a deployed position, said extension plate having a deployed upper surface when in said deployed position; and
a support plate, said support plate having a support plate top, wherein said support plate is a movable support plate movable from a lower position completely within said cavity to a raised position relative to said body wherein said support plate top is generally flush with said deployed upper surface of said extension plate when said support plate is in said raised position.

9. The tailgate of claim 8 further comprising:
a first side plate pivotally connected to said body; and
a second side plate pivotally connected to said body.

10. The tailgate of claim 9 wherein said support plate is pivotally connected to each of said first side plate and said second side plate, and is movable relative to said body under operation of said first side plate and said second side plate.

11. The tailgate of claim 10 wherein:
said support plate comprises a first slot and a second slot:
said first side plate has a first side plate eyelet, said first side plate eyelet having a first side plate eyelet axis;
said second side plate has a second side plate eyelet, said second side plate eyelet having a second side plate eyelet axis;
said first side plate eyelet axis being parallel to said second side plate eyelet axis;
a first pin connects said first side plate eyelet to said first slot; and
a second pin connects said second side plate eyelet to said second slot.

12. The tailgate of claim 11 wherein:
said first side plate eyelet passes in an orbital path as said first side plate is moved to a first side plate upwards position;
said second side plate eyelet passes in an orbital path as said second side plate is moved to a second side plate upwards position.

13. A tailgate comprising:
an extension plate;
a first side plate;
a second side plate; and
a support plate having a support plate first end that is pivotally connected to said first side plate and a support plate second end that is pivotally connected to said second side plate, said support plate being a movable support plate that is raisable under operation of said first side plate and said second side plate.

14. The tailgate of claim 13 wherein:
said support plate comprises a first slot and a second slot:
said first side plate has a first side plate eyelet, said first side plate eyelet having a first side plate eyelet axis;
said second side plate has a second side plate eyelet, said second side plate eyelet having a second side plate eyelet axis;
said first side plate eyelet axis being parallel to said second side plate eyelet axis;
a first pin connects said first side plate eyelet to said first slot; and
a second pin connects said second side plate eyelet to said second slot.

15. The tailgate of claim 14 wherein:
said first side plate eyelet passes in an orbital path as said first side plate is moved to a first side plate upwards position;
said second side plate eyelet passes in an orbital path as said second side plate is moved to a second side plate upwards position,
operation of said first side plate is independent of operation of said second side plate.

16. The tailgate of claim 13 wherein:
said tailgate comprises a body; and
said extension plate is pivotally connected to said body.

17. The tailgate of claim 13 wherein said extension plate comprises a first piece pivotally connected to a second piece.

* * * * *